US012547771B2

(12) United States Patent
Nozawa et al.

(10) Patent No.: US 12,547,771 B2
(45) Date of Patent: Feb. 10, 2026

(54) PRIVACY PROTECTION DATA ASSOCIATION SYSTEM

(71) Applicant: NTT DOCOMO, INC., Chiyoda-ku (JP)

(72) Inventors: Kazuma Nozawa, Chiyoda-ku (JP);
Tomohiro Nakagawa, Chiyoda-ku (JP);
Kazuya Sasaki, Chiyoda-ku (JP);
Masayuki Terada, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 49 days.

(21) Appl. No.: 18/558,240

(22) PCT Filed: Feb. 22, 2022

(86) PCT No.: PCT/JP2022/007281
§ 371 (c)(1),
(2) Date: Oct. 31, 2023

(87) PCT Pub. No.: WO2022/254821
PCT Pub. Date: Dec. 8, 2022

(65) Prior Publication Data
US 2024/0220656 A1    Jul. 4, 2024

(30) Foreign Application Priority Data

Jun. 4, 2021   (JP) .................................. 2021-094104

(51) Int. Cl.
*G06F 21/62*    (2013.01)
*G06F 21/60*    (2013.01)

(52) U.S. Cl.
CPC ........ *G06F 21/6254* (2013.01); *G06F 21/602* (2013.01)

(58) Field of Classification Search
CPC ............... G06F 21/6254; G06F 21/602; G06F 21/6245; G06F 21/62
See application file for complete search history.

(56) References Cited

U.S. PATENT DOCUMENTS

| 10,541,983 | B1* | 1/2020 | Khashei Varnamkhasti ................ H04L 9/085 |
| 11,397,824 | B2* | 7/2022 | Racz .................. H04N 21/8456 |
| 2023/0058965 | A1* | 2/2023 | Best ...................... H04L 9/3247 |

FOREIGN PATENT DOCUMENTS

| JP | 2010-211590 A | 9/2010 |
| JP | 2011-81301 A | 4/2011 |

OTHER PUBLICATIONS

International Preliminary Report on Patentability and Written Opinion issued on Dec. 14, 2023 in PCT/JP2022/007281, 6 pages.

(Continued)

*Primary Examiner* — Mohammed Waliullah
(74) *Attorney, Agent, or Firm* — Oblon, McClelland, Maier & Neustadt, L.L.P.

(57) ABSTRACT

In a privacy protection data association system including devices (10A, 10B) which maintain user data including a user ID and personal information, each device includes: a de-identification processing unit (11) which performs an irreversible conversion process on the user ID and a privacy protection process on the personal information and generates de-identified data corresponding to the user data satisfying target user conditions; an encryption unit (12) which generates double-encrypted de-identified data using a self-encryption key and a partner encryption key in cooperation between its own device and a partner device without disclosing the keys; an aggregation processing unit (13) which compares data generated by the two devices and aggregates the number of data whose user ID parts match each other, as the number of target users; and a disclosure limitation (Continued)

processing unit (14) which generates disclosure limited statistical information by performing a disclosure limitation process for an aggregating result.

17 Claims, 13 Drawing Sheets

(56) References Cited

OTHER PUBLICATIONS

International Search Report mailed on Apr. 26, 2022 in PCT/JP2022/007281 filed on Feb. 22, 2022, 2 pages.
Japanese Office Action dated Dec. 16, 2025, issued in Japanese Patent Application No. 2024-208239 (with English translation; Document 28 being cited therein).
"Introduction to Privacy Preserving Record Linkage", ScaDS.AI Dresden/Leipzig (Center for Scalable Data Analytics and Artificial Intelligence), https://scads.ai/introduction-to-privacy-preserving-record-linkage/, Jan. 2, 2017.

\* cited by examiner

Company A: De-identified data

| Hash Value | Use Status |
|---|---|
| 4a3 | 1: PRESENCE |
| 2b7 | 1: PRESENCE |
| 3c0 | 0: ABSENCE |
| 5d9 | 0: ABSENCE |
| 1e5 | 0: ABSENCE |
| 6f8 | 1: PRESENCE |

↓ Binarization

Target attribute information

| Hash Value | Presence of Use | Absence of Use |
|---|---|---|
| 4a3 | 1 | 0 |
| 2b7 | 1 | 0 |
| 3c0 | 0 | 1 |
| 5d9 | 0 | 1 |
| 1e5 | 0 | 1 |
| 6f8 | 1 | 0 |

⇓ Division

Company A: Data of Presence of Use (Target Attribute Information 10)

| Hash Value | Presence of Use | Absence of Use |
|---|---|---|
| 4a3 | 1 | 0 |
| 2b7 | 1 | 0 |
| 6f8 | 1 | 0 |

Company A: Data of Absence of Use (Target Attribute Information 01)

| Hash Value | Presence of Use | Absence of Use |
|---|---|---|
| 3c0 | 0 | 1 |
| 5d9 | 0 | 1 |
| 1e5 | 0 | 1 |

(b)

Company B: De-identified data

| Hash Value | Store Visit Information |
|---|---|
| 4a3 | 1: PRESENCE |
| 3c0 | 0: ABSENCE |
| 6f8 | 0: ABSENCE |
| 7g4 | 0: ABSENCE |
| 1e5 | 1: PRESENCE |
| 5d9 | 1: PRESENCE |

↓ Binarization

Target attribute information

| Hash Value | Presence of Store Visit | Absence of Store Visit |
|---|---|---|
| 4a3 | 1 | 0 |
| 3c0 | 0 | 1 |
| 6f8 | 0 | 1 |
| 7g4 | 0 | 1 |
| 1e5 | 1 | 0 |
| 5d9 | 1 | 0 |

⇓ Division

Company B: Data of Presence of Store Visit (Target Attribute Information 10)

| Hash Value | Presence of Store Visit | Absence of Store Visit |
|---|---|---|
| 4a3 | 1 | 0 |
| 1e5 | 1 | 0 |
| 5d9 | 1 | 0 |

Company B: Data of Absence of Store Visit (Target Attribute Information 01)

| Hash Value | Presence of Store Visit | Absence of Store Visit |
|---|---|---|
| 3c0 | 0 | 1 |
| 6f8 | 0 | 1 |
| 7g4 | 0 | 1 |

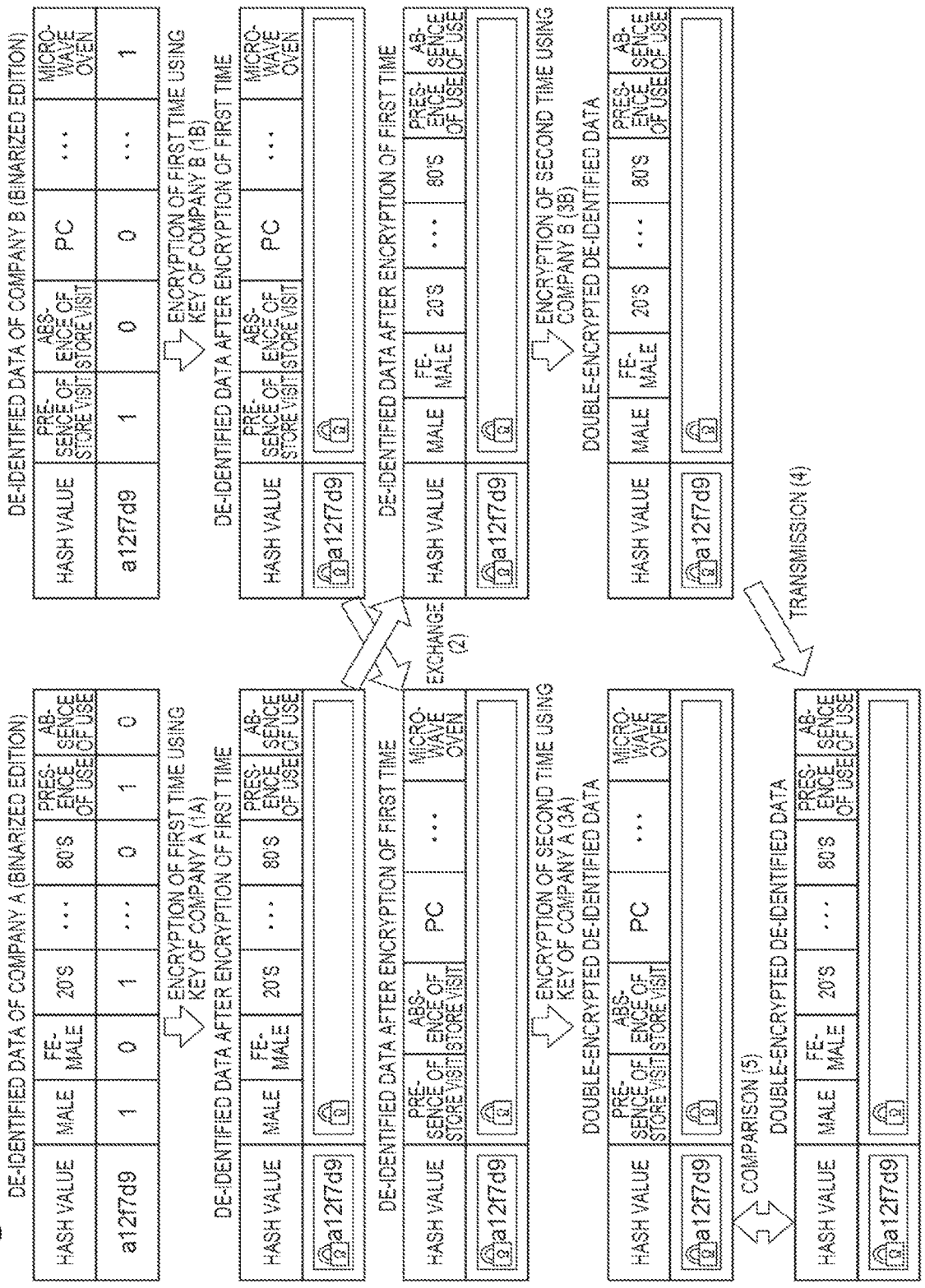

AGGREGATION RESULT

|  | PRESENCE OF STORE VISIT | ABSENCE OF STORE VISIT |
|---|---|---|
| PRESENCE OF USE | 1 | 1 |
| ABSENCE OF USE | 2 | 1 |

⇩ DISCLOSURE LIMITATION PROCESS BASED ON DIFFERENTIAL PRIVACY

STATISTICAL INFORMATION

|  | PRESENCE OF STORE VISIT | ABSENCE OF STORE VISIT |
|---|---|---|
| PRESENCE OF USE | n1 | n2 |
| ABSENCE OF USE | n3 | n4 |

PRIVACY PROTECTION DATA ASSOCIATION SYSTEM

TECHNICAL FIELD

The present disclosure relates to a privacy protection data association system.

BACKGROUND ART

When a statistical analysis or the like is performed targeting user data managed in a database in an information processing device (a device broadly including a computer, a server, and the like; hereinafter, referred to as a "device") of a plurality of organizations, in a case in which this user data includes personal information, a certain countermeasure needs to be taken from a point of view of privacy protection. As an example of the countermeasure described above, by using a system configuration having an interface capable of simultaneously handling both data that is a target for disclosure limitation and data that can be disclosed, a technology for integrating both types of data mentioned above while the target data for disclosure limitation is disclosure limited is known (Patent Literature 1 presented below). In addition, a technology for protecting personal information by making it difficult for a third party to restore an original ID by performing both a reversible encryption process and an irreversible encryption process on IDs of respective personal information when user data including personal information is integrated between a plurality of devices is known (Patent Literature 2 presented below).

CITATION LIST

Patent Literature

[Patent Literature 1] Japanese Unexamined Patent Publication No. 2011-081301
[Patent Literature 2] Japanese Unexamined Patent Publication No. 2010-211590

SUMMARY OF INVENTION

Technical Problem

However, in the technology disclosed in Patent Literature 1, it is essential to select data that is a target for disclosure limitation from among input user data, and a case in which data that can be disclosed is not included in user data, in other words, a case in which all of the input user data is a target for disclosure limitation is not considered, and there is a room for improvement in this point. In the technology disclosed in Patent Literature 2, it is essential to perform both the reversible encryption process and the irreversible encryption process, the reversible encryption process remains, and thus there is a possibility of restoration, whereby there is a room for improvement. In addition, common to Patent Literatures 1 and 2, a possibility of estimating a correspondence relation between a process result and an individual is not completely excluded, and thus there is a room for improvement from a point of view of privacy protection.

An object of the present disclosure is to generate statistical information from which a correspondence relation with an individual is excluded without disclosing any personal information to other devices by cooperating with each other among a plurality of devices maintaining personal information.

Solution to Problem

A privacy protection data association system according to the present disclosure is a privacy protection data association system including a plurality of devices maintaining user data including a user ID and personal information relating to a user and generating statistical information relating to a number of target users in cooperation between one device and a partner device among the plurality of devices, wherein each of the devices includes: a de-identification processing unit configured to perform an irreversible conversion process on the user ID and a process for privacy protection on the personal information targeting the user data maintained by its own device and, on the basis of a condition that the personal information included in the user data needs to satisfy for extracting the target users, generate de-identified data corresponding to the user data of which the personal information satisfies the condition; an encryption unit configured to perform encryption of a first time based on a self-encryption key maintained by its own device and a unidirectional commutative operation with a key targeting the de-identified data generated by the de-identification processing unit of its own device that is the one device and perform encryption of a second time based on the self-encryption key and the unidirectional commutative operation with a key targeting the de-identified data after the encryption of the first time based on a partner encryption key, which is maintained by the partner device, acquired through exchange with the partner device and the unidirectional commutative operation with a key to generate double-encrypted de-identified data after double encryption using the self-encryption key and the partner encryption key; an aggregation processing unit configured to aggregate the number of target users by comparing the double-encrypted de-identified data generated by the encryption unit of the partner device with the double-encrypted de-identified data generated by the encryption unit of its own device and counting the number of pieces of the double-encrypted de-identified data of which user ID correspondence parts identified on the basis of structure information of the user data set in advance match each other; and a disclosure limitation processing unit configured to generate disclosure limited statistical information by performing a disclosure limitation process targeting an aggregating result acquired by the aggregation processing unit.

In the privacy protection data association system described above, each of the plurality of devices includes the constituent elements described above, and thus, the de-identification processing unit of each of one device and a partner device among the plurality of devices performs an irreversible conversion process on the user ID and a process for privacy protection on the personal information targeting the user data maintained by its own device and, on the basis of a condition that the personal information included in the user data needs to satisfy for extracting the target users, generates de-identified data corresponding to the user data of which the personal information satisfies the condition, and the encryption unit of each of the devices performs encryption of a first time based on a self-encryption key maintained by its own device and a unidirectional commutative operation with a key targeting the de-identified data generated by the de-identification processing unit of its own device and performs encryption of a second time based on the self-encryption key and the unidirectional commutative operation with a key targeting the de-identified data after the encryption of the first time based on a partner encryption key, which is maintained by the partner device, acquired through exchange with the partner device and the unidirectional commutative operation with a key to generate double-encrypted de-identified data after double encryption using the self-encryption key and the partner encryption key. In accordance with such encryption, the encryption unit of each device can generate double-encrypted de-identified data after double encryption using a self-encryption key and a partner encryption key without disclosing the personal information included in the user data, which has not been encrypted, maintained by its own device and the self-encryption key to the partner device. In addition, encryption of a total of two times is also on the basis of the unidirectional commutative operation with a key, and thus in accordance with match/mismatch of user ID correspondence parts identified on the basis of structure information of the user data set in advance in the double-encrypted de-identified data of one device and the double-encrypted de-identified data generated by the partner device, and it can be determined whether or not the two pieces of the double-encrypted de-identified data described above correspond to user data of the same user.

Thus, the aggregation processing unit of one device aggregates the number of target users by comparing the double-encrypted de-identified data generated by the encryption unit of its own device with the double-encrypted de-identified data generated by the encryption unit of the partner device and counting the number of pieces of the double-encrypted de-identified data of which user ID correspondence parts match each other, and the disclosure limitation processing unit of one device generates disclosure limited statistical information by performing a disclosure limitation process targeting the aggregating result described above. As described above, by performing association among a plurality of devices maintaining user data (including personal information), statistical information in which a correspondence relation with an individual is excluded can be generated without disclosing details of the personal information to other devices. Such useful statistical information can be effectively utilized for an advertisement plan, a guest collection plan, and the like for both organizations maintaining the devices.

Advantageous Effects of Invention

According to the present disclosure, by associating a plurality of devices maintaining personal information, statistical information from which a correspondence relation with an individual is excluded can be generated without disclosing details of personal information to other devices.

BRIEF DESCRIPTION OF DRAWINGS

FIG. 4(a) is a diagram for describing grouping of de-identified data using the company A's device, and FIG. 4(b) is a diagram for describing grouping of de-identified data using the company B's device.

FIG. 5 is a diagram for describing an encryption process of de-identified data using the company A's device and company B's device.

DESCRIPTION OF EMBODIMENTS

Hereinafter, a privacy protection data association system according to an embodiment of the present disclosure will be described with reference to the drawings.
(Configuration of Privacy Protection Data Association System)

Figure 1:
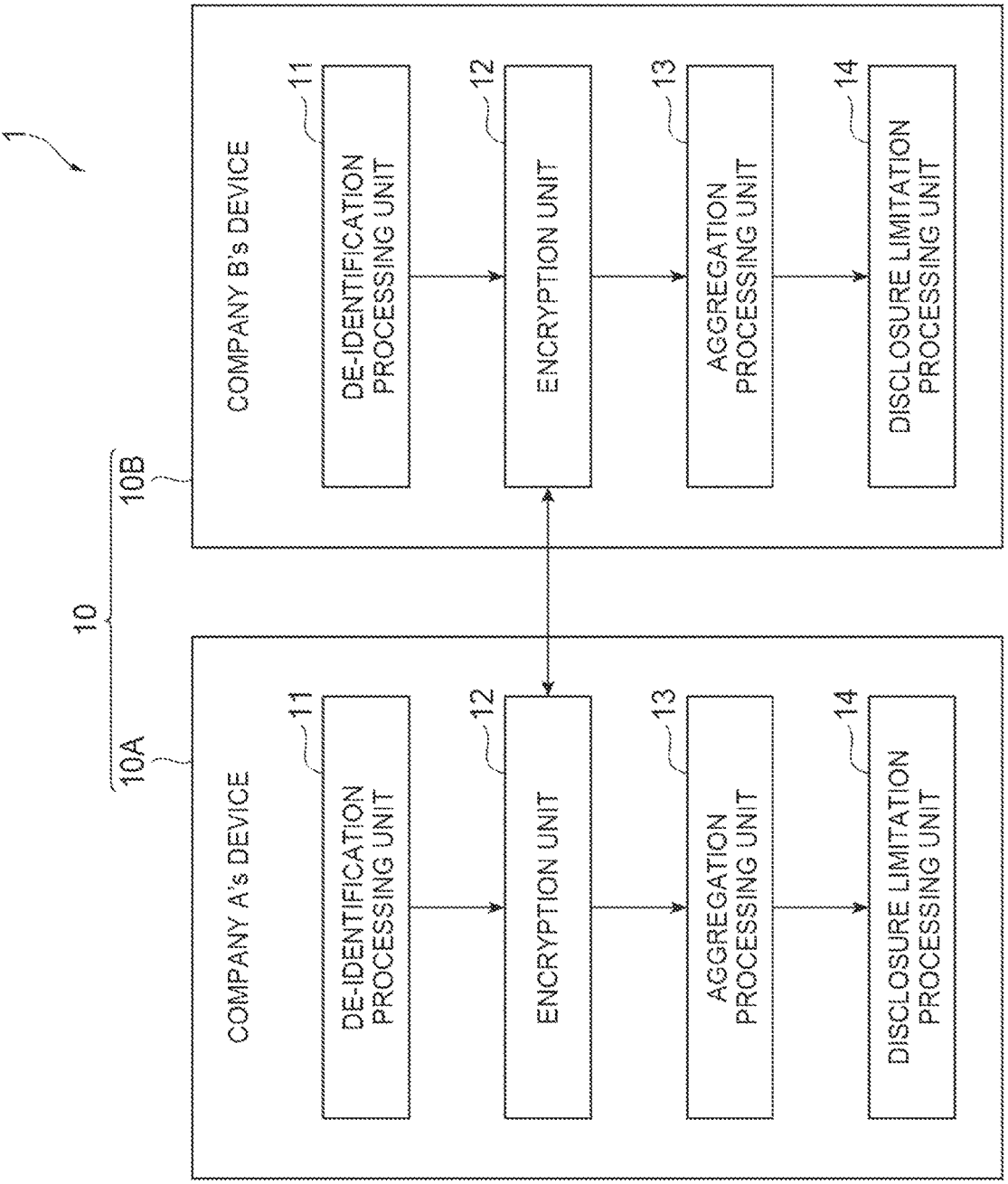
FIG. 1 is a configuration diagram of a privacy protection data association system according to an embodiment of the present disclosure.

As illustrated in FIG. 1, a privacy protection data association system 1 according to the present disclosure includes a plurality of devices 10 capable of communicating with each other, and, as will be described above, statistical information relating to the number of target users is generated in cooperation between one device and a partner device among the plurality of devices 10. In other words, after both one device and a partner device perform "generation of de-identified data" and "encryption of de-identified data" to be described below, one device that has received double encrypted de-identified data from the partner device performs a "aggregation process" and a "disclosure limitation process", thereby generating statistical information. In addition, for the convenience of description, although two devices 10A and 10B are illustrated in FIG. 1, three or more devices may be included. In the following process, although an example in which a company A's device 10A operates as "one device", and a company B's device 10B operates as a "partner device" is described, each device 10 may include a functional block configuration as described below and may operate as "one device" and operate as a "partner device".

Figure 3:
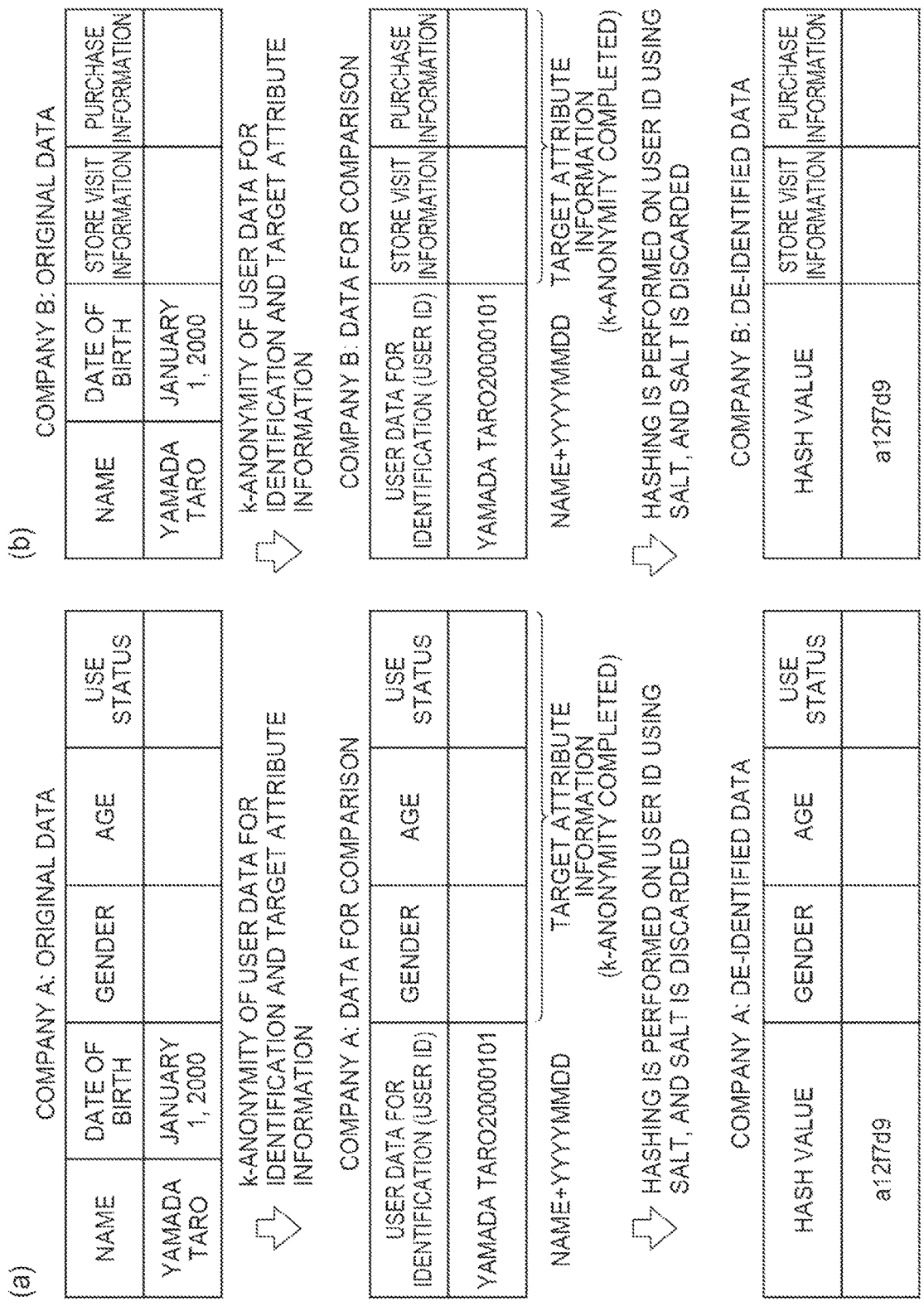
FIG. 3(a) is a diagram for describing a de-identified data generating process using a company A's device.
FIG. 3(b) is a diagram for describing a de-identified data generating process using a company B's device.

Each device 10 stores user data including a "user ID" and "personal information" relating to a user in a built-in memory not illustrated in the drawing. Among these, while the "user ID" described above is in a data format that is common between devices, a type of the "personal information" described above is set for each device in advance and is not necessarily common among devices. For example, user data maintained by the company A's device 10A illustrated in an upper stage in FIG. 3(a) includes "name" and "date of birth" corresponding to a user ID and "gender", "age", and "use status" corresponding to personal information, and user data maintained by the company B's device 10B illustrated in an upper stage in FIG. 3(b) includes "name" and "date of birth" corresponding to a user ID and "store visit information" and "purchase information" corresponding to personal information. In this way, although "name" and "date of birth" corresponding to a user ID configure a common data format, types of information corresponding to personal information are different between the devices. For example, "use status" included in the personal information of company A described above is information representing that a service provided by the company A is used/not used (presence/absence of use), and "store visit information" included in the personal information of company B described above is information representing that a user has visited/never visited a store operated by company B (presence/absence of store visit), and "purchase information" is information representing products (a personal computer (PC), a microwave oven, and the like) purchased at the time of visiting a store. In addition, structure information of user data maintained by each device 10 is shared in advance between devices, and, on the basis of this structure information, "user ID correspondence part" in double-encrypted de-identified data generated in each device 10 to be described below can be identified, and "user ID correspondence parts" between pieces of double encrypted de-identified data to be described below can be compared with each other.

Hereinafter, a functional block configuration of each device 10 will be described, for example, using the company A's device 10A. As illustrated in FIG. 1, the device 10A includes a de-identification processing unit 11, an encryption unit 12, an aggregation processing unit 13, and a disclosure limitation processing unit 14.

Among these, the de-identification processing unit 11 is a functional unit that, targeting user data maintained by the device 10A of its own device, performs an irreversible conversion process for a user ID and a process for privacy protection for personal information and, on the basis of a condition to be satisfied by the personal information included in user data for extracting a target user, generates de-identified data corresponding to user data of which personal information satisfies this condition.

In addition, in this embodiment, a process of associating the company A's device 10A with the company B's device 10B, setting a total of four conditions according to a combination of personal information "use status" (presence of use/absence of use) included in the user data of company A and personal information "store visit information" (presence of store visit/absence of store visit) included in the user data of company B as conditions for extracting target users, and generating statistical information by aggregating the number of target users for each of such conditions will be described below. In addition, in this embodiment, although an example in which a hashing process using a hash function shared among devices 10 in advance is performed is described as an example of "irreversible conversion process", the irreversible conversion process is not limited to the hashing process. In addition, as an example of "privacy protection", although k-anonymity will be described, another technique such as l-diversity or t-similarity may be used, and a combination of two or more techniques may be used.

The encryption unit 12 is a functional unit that generates double encrypted de-identified data after double encryption using a self-encryption key maintained by its own device 10A and a partner encryption key maintained by the partner device 10B by associating its own device 10A that is one device with the partner device 10B as below. In other words, the encryption unit 12 performs encryption of a first time based on a self-encryption key and a unidirectional commutative operation with a key targeting de-identified data generated by the de-identification processing unit 11 of its own device 10A, exchanges de-identified data after the encryption of the first time with the partner device 10B (that is, the partner device 10B that has performed the encryption of the first time based on a partner encryption key and a unidirectional commutative operation with a key targeting de-identified data generated by the de-identification processing unit 11 of the device 10B), and performs encryption of a second time based on a self-encryption key and a unidirectional commutative operation with a key targeting de-identified data after the encryption of the first time received from the device 10B of the partner, thereby generating double encrypted de-identified data after double encryption using the self-encryption key and the partner encryption key. At this time, similar to the description presented above, also the encryption unit 12 of the device 10B of the partner performs encryption of a second time based on the partner encryption key and a unidirectional commutative operation with a key, thereby generating double encrypted de-identified data after double encryption using the self-encryption key and the partner encryption key. In addition, an encryption process targeting de-identified data using the encryption unit 12 is performed with being divided for "a part corresponding to a user ID" and "a part corresponding to personal information" of de-identified data.

In the encryption as described above, de-identified data after encryption of the first time that is exchanged between the devices 10A and 10B is encrypted on the basis of an encryption key of a partner not disclosed in its own device, and thus its own device cannot decode this de-identified data and cannot recognize details (personal information and the like) of this de-identified data. Similarly, also the partner device cannot decode de-identified data after the encryption of the first time acquired through exchange and cannot recognize details (personal information and the like) of this de-identified data. In this way, the encryption unit 12 can generate double-encrypted de-identified data after double encryption using a self-encryption key and a partner encryption key without disclosing personal information included in user data, which has not been encrypted, maintained by its own device 10A and the self-encryption key to the partner device 10B. In addition, since encryption of a total of two-times is encryption based on a unidirectional commutative operation with a key, in double-encrypted de-identified data generated by its own device 10A and double-encrypted de-identified data generated by the partner device 10B, in accordance with match/mismatch of bit strings corresponding user ID correspondence parts identified on the basis of structure information of user data shared between the devices 10A and 10B in advance, it can be determined whether or not two pieces of the double-encrypted de-identified data described above correspond to user data of the same user.

The aggregation processing unit 13 is a functional unit that compares double-encrypted de-identified data generated by the encryption unit 12 of the partner device 10B with double-encrypted de-identified data generated by the encryption unit 12 of its own device 10A and aggregates the number of target users by counting the number of pieces of double-encrypted de-identified data of which "user ID correspondence parts" match each other. As described above, in accordance with match/mismatch of "user ID correspondence parts", which are identified on the basis of a data structure of user data, between these two pieces of double-encrypted de-identified data, it can be determined whether or not the two pieces of double-encrypted de-identified data described above correspond to user data of the same user, and thus, by counting the number of pieces of double-encrypted de-identified data of which "user ID corresponding parts" match each other as a result of the comparison described above, that is, the number of pieces of double-encrypted de-identified data determined to be in correspondence with user data of the same user, the aggregation processing unit 13 aggregates "the number of target users" corresponding to the number of pieces of double-encrypted de-identified data of which personal information satisfies a condition of target users.

The disclosure limitation processing unit 14 is a functional unit that performs a disclosure limitation process targeting an aggregating result acquired by the aggregation processing unit 13 and generates disclosure limited statistical information. In addition, in this embodiment, as an example of the "disclosure limitation process", although a disclosure limitation process of applying noise having an intensity of a certain level or more, in other words, an example in which a disclosure limitation process based on differential privacy is performed is described, the disclosure limitation process is not limited to a disclosure limitation process based on differential privacy.

While each device 10 configuring the privacy protection data association system 1 includes the functional units as described above, details of functions thereof will become apparent in description of processes based on the following FIGS. 2 to 8.

(Process Performed in Privacy Protection Data Association System)

Hereinafter, an example in which the company A's device 10A operates as "one device", and the company B's device 10B operates as "partner device" will be described.

In the company A's device 10A, the de-identification processing unit 11 performs k-anonymity of "target attribute information" that is personal information of user data maintained by its own device 10A (Step A1), performs a hashing process using a hash function shared between the devices 10 in advance targeting "user ID" of the user data, and thereafter discards salt used in the hashing process (Step A2). When the processes of Steps A1 and A2 described above are supplement on the basis of FIG. 3(*a*), in an example in which user data to be processed includes name "Yamada Taro" and date of birth "Jan. 1, 2000" corresponding to "user ID", for a subsequent process, the name and the date of birth are changed in form into "Yamada Taro 20000101" that is a format of "name+YYYYIMDD", k-anonymity of a gender, age, and a use status corresponding to "target attribute information" is performed, a user ID is converted into a hash value by performing a hashing process for "user ID" using salt, and thereafter, the salt is discarded. In accordance with this, de-identified data including a hash value "a12f7d9" corresponding to the "user ID" and the "target attribute information", for which k-anonymity has been performed, is acquired.

As described above, in this embodiment, an example in which a total of four conditions corresponding to a combination of personal information "use status" (presence of use/absence of use) of user data of company A and personal information "store visit information" (presence of visit/absence of visit) of user data of company B are set as conditions for extracting target users, and statistical information is generated by collecting the number of target users for each of such conditions is described. Thus, the de-identification processing unit 11 of the company A's device 10A binarizes the target attribute information (Step A3) and separates each bit string of the target attribute information (Step A4). Here, on the basis of FIG. 4(*a*), the processes of Steps A3 and A4 described above will be described supplementarily. In addition, for easy description, FIG. 4(*a*) illustrates an example in which only "use status" (use/non-use) is focused as target attribute information corresponding to personal information. Similarly, FIG. 4(*b*) to be described below illustrates an example in which only "store visit information" (presence of store visit/absence of store visit) is focused as target attribute information corresponding to personal information as well.

As in an upper stage in FIG. 4(*a*), in a case in which de-identified data to be processed includes "hash value" corresponding to a user ID and "use status" (1: presence, 0: absence) corresponding to the target attribute information, the de-identification processing unit 11 binarizes the target attribute information in accordance with the use status (1: presence, 0: absence). At this time, as in a middle stage in FIG. 4(*a*), for example, since data of a hash value "4a3" represents the presence of the use status, the data is converted into data in which a bit of "presence of the use status" is "1", and a bit of "absence of the use status is "0". On the other hand, since data of a hash value "300" represents the absence of the use status, the data is converted into data in which the bit of "presence of the use status" is "0", and a bit of "absence of use status is "1". Then, the de-identification processing unit 11 separates de-identified data for each bit string (here, "10" or "01") of the target attribute information, and as a result, as in a lower stage in FIG. 4(*a*), the de-identified data is divided into a group in which a bit string of the target attribute information is "10" and a group in which a bit string of the target attribute information is "01".

In addition, similarly, also in the company B's device 10B, the de-identification processing unit 11 performs k-anonymity of "target attribute information" of user data maintained by the device 10B (Step B1), hashes "user ID" included in the user data using a hash function shared between the devices 10 in advance, and thereafter discards salt used in the hashing (Step B2). When supplemented on the basis of FIG. 3(*b*), in the example in which raw data to be processed includes name "Yamada Taro" and date of birth "Jan. 1, 2000" corresponding to "user ID", for a subsequent process, parts of the name and the date of birth are changed in form into "Yamada Taro 20000101" that is a format of "name+YYYYMDD (that is, a format in which YYYY represents "year", MEM represents "month", and DD represents "date"), k-anonymity of parts of a visited store and purchase information corresponding to "target attribute information" is performed, a user ID is converted into a hash value by performing a hashing process targeting "user ID" using salt, and thereafter, the salt is discarded. In accordance with this, de-identified data including a hash value "a12f7d9" corresponding to the "user ID" and the "target attribute information", for which k-anonymity has been performed, is acquired.

In addition, the de-identification processing unit 11 of the company B's device 10B binarizes the target attribute information (Step B3) and separates each bit string of the target attribute information (Step B4). Here, when the processes of Steps B3 and B4 described above are described supplementarily on the basis of FIG. 4(b), in the example in which de-identified data to be processed includes "hash value" corresponding to a user ID and "store visit information" (1: presence, 0: absence) corresponding to the target attribute information as in an upper stage in FIG. 4(b), the de-identification processing unit 11 binarizes the target attribute information in accordance with the store visit information (1: presence, 0: absence). At this time, as in a middle stage in FIG. 4(b), for example, since data of a hash value "4a3" represents the presence of the store visit information, the data is converted into data in which a bit of "presence of store visit information" is "1", and a bit of "absence of store visit information" is "0". On the other hand, since data of a hash value "3c0" represents the absence of the store visit information, the data is converted into data in which the bit of "presence of the store visit information" is "0", and a bit of "absence of the store visit information is "1". Then, the de-identification processing unit 11 separates de-identified data for each bit string (here, "10" or "01") of the target attribute information, and as a result, as in a lower stage in FIG. 4(b), the de-identified data is divided into a group in which a bit string of the target attribute information is "10" and a group in which a bit string of the target attribute information is "01".

Next, in association with the company A's device 10A and the company B's device 10B, encryption of de-identified data illustrated in FIG. 5 as below is performed.

Figure 2:
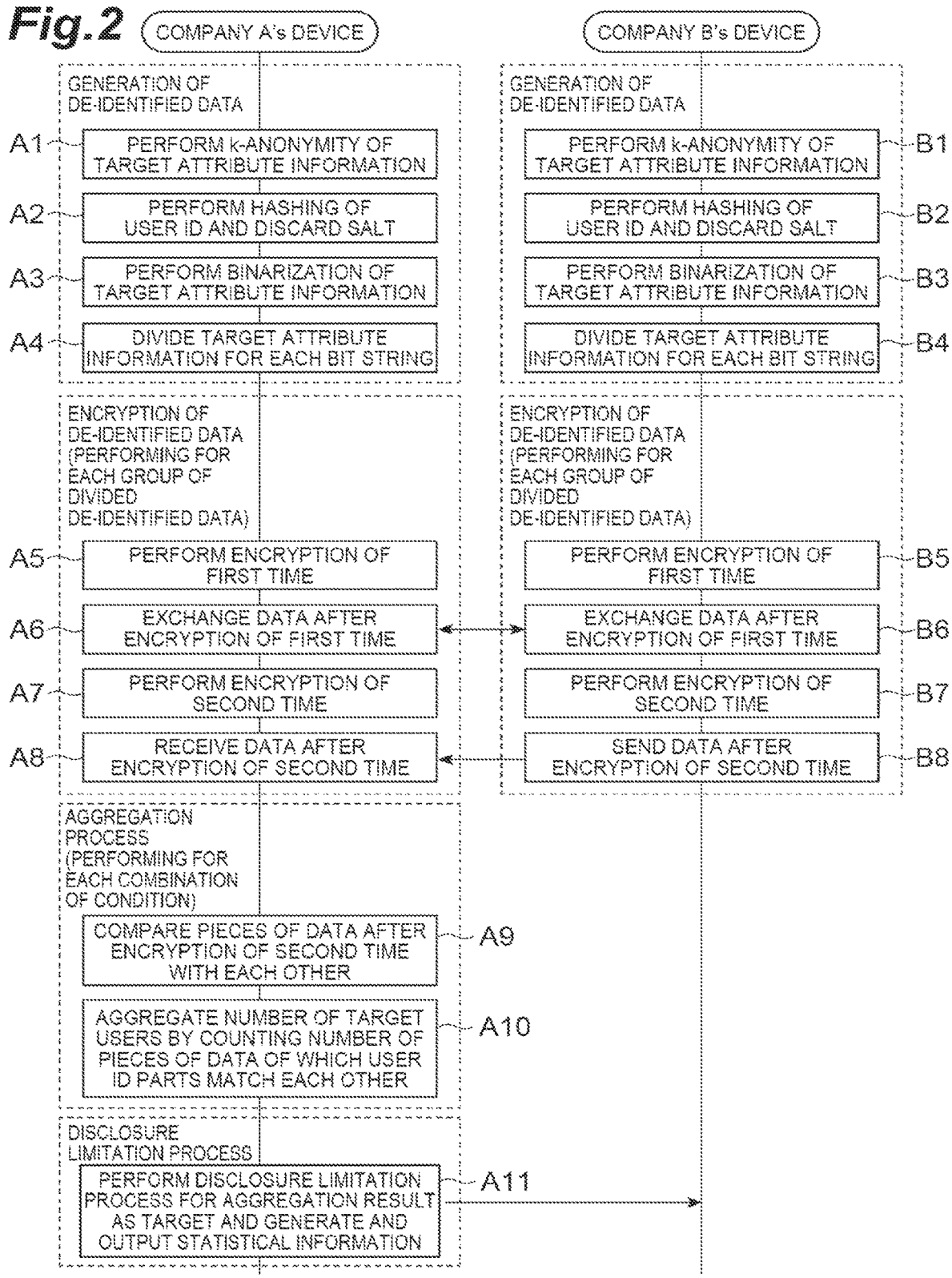
FIG. 2 is a flowchart illustrating a process performed by a privacy protection data association system according to an embodiment of the present disclosure.

In the company A's device 10A, the encryption unit 12 performs encryption of a first time based on an encryption key maintained by the device 10A and a unidirectional commutative operation with a key targeting de-identified data generated by the de-identification processing unit 11 of the device 10A (Step A5 illustrated in FIG. 2; a process (1A) illustrated in FIG. 5). In addition, in the company B's device 10B, the encryption unit 12 performs encryption of a first time based on an encryption key maintained by the device 10B and a unidirectional commutative operation with a key targeting de-identified data generated by the de-identification processing unit 11 of the device 10B (Step B5 illustrated in FIG. 2; a process (1B) illustrated in FIG. 5). Then, between the devices 10A and 10B, the de-identified data after the encryption of the first time is exchanged (Steps A6 and B6 illustrated in FIG. 2; a process (2) illustrated in FIG. 5)). The de-identified data after the encryption of the first time exchanged between the devices 10A and 10B is encrypted on the basis of an encryption key of a partner not disclosed in its own device, and thus its own device cannot decode this de-identified data and cannot recognize details (personal information and the like) of this de-identified data. Similarly, also the partner device cannot decode de-identified data after the encryption of the first time acquired through exchange and cannot recognize details (personal information and the like) of this de-identified data.

Then, in the company A's device IGA, the encryption unit 12 performs encryption of a second time based on an encryption key maintained by the device 10A and a unidirectional commutative operation with a key targeting the de-identified data after the encryption of the first time received from the partner device 10B and, in accordance with this, generates double-encrypted de-identified data after double encryption using the encryption key of the device IGA and the encryption key of the device 10B (Step A7 illustrated in FIG. 2; a process (3A) illustrated in FIG. 5). In addition, in the company B's device 10B, the encryption unit 12 performs encryption of a second time based on an encryption key maintained by the device 10B and a unidirectional commutative operation with a key targeting the de-identified data after the encryption of the first time received from the partner device 10A and, in accordance with this, generates double-encrypted de-identified data after double encryption using the encryption key of the device 10A and the encryption key of the device 10B (Step B7 illustrated in FIG. 2; a process (3B) illustrated in FIG. 5).

Furthermore, the encryption unit 12 of the company B's device 10B transmits the double-encrypted de-identified data acquired in Step B7 to the encryption unit 12 of the company A's device 10A (Step B8; a process (4) illustrated in FIG. 5), and the encryption unit 12 of the company A's device 10A receives the double-encrypted de-identified data from the company B's device 10B (Step A8).

Here, the encryption process described above will be described supplementarily with reference to FIG. 6. When data of company A is a, data of company B is b, a secret key maintained by the company A's device 10A is ka, a secret key maintained by the company B's device 10B is kb, and a process of encrypting x using a secret key k is $f_k(x)$ (here, $f_k(x)$ is a unidirectional commutative hash function with a key), $f_{ka}(a)$ and $f_{kb}(b)$ are acquired through encryption of a first time, these are exchanged between the devices 10A and 10B, next, $f_{ka}(f_{kb}(b))$ is acquired by the company A's device 10A by performing encryption of a second time using the secret key ka of company A, and $f_{kb}(f_{ka}(a))$ is acquired by the company B's device 10B by performing encryption of a second time using the secret key kb of company B. Then, $f_{kb}(f_{ka}(a))$ is transmitted from the company B's device 10B to the company A's device 10A.

As above, both the company A's device 10A and the company B's device 10B perform encryption two times without disclosing the secret keys ka and kb maintained by their own devices to the partner device. In addition, since $f_k(x)$ is a unidirectional commutative hash function with a key, $f_{kb}(f_{ka}(a))=f_{ka}(f_{kb}(b))$ is satisfied in a case in which a=b from characteristics of the commutative hash function.

Figure 7:
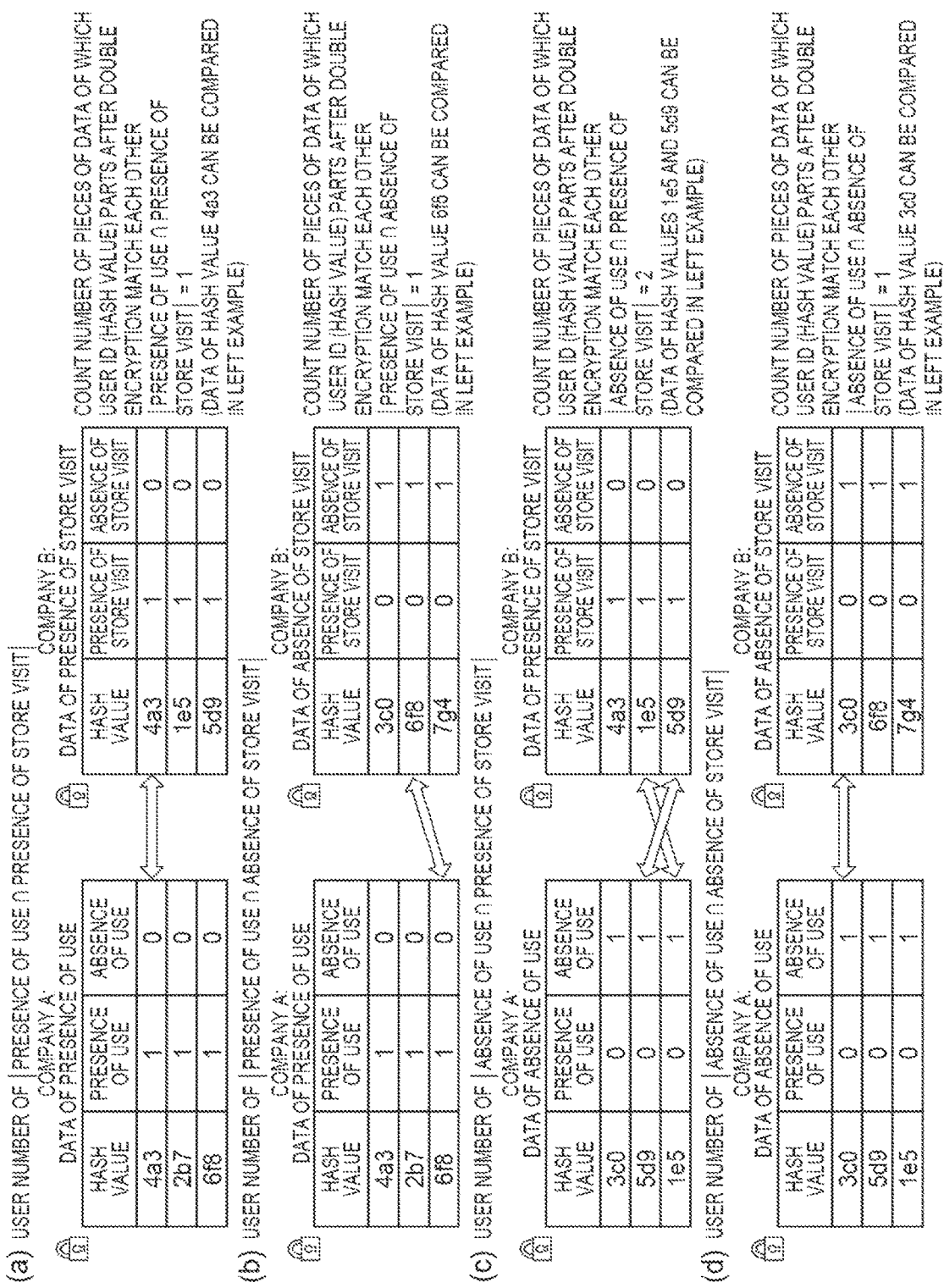
FIG. 7(a) is a diagram for describing a process of aggregating the number of users having presence of use and presence of store visit.
FIG. 7(b) is a diagram for describing a process of aggregating the number of users having presence of use and absence of store visit.
FIG. 7(c) is a diagram for describing a process of aggregating the number of users having absence of use and presence of store visit.
FIG. 7(d) is a diagram for describing a process of aggregating the number of users having absence of use and absence of store visit.
Figure 8:
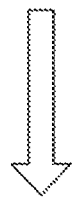
FIG. 8 is a diagram for describing a disclosure limitation process.

Next, in the company A's device 10A, an aggregation process for each of combinations of conditions represented in FIG. 7 as below is performed. In other words, the aggregation processing unit 13 of the company A's device 10A compares pieces of double encrypted de-identified data after encryption of the second time with each other for each of combinations of conditions (Step A9 illustrated in FIG. 2) and aggregates the number of target users by counting the number of pieces of data of which "user ID parts" identified on the basis of the structure information of user data shared between the devices 10A and 10B in advance match each other (Step A10 illustrated in FIG. 2).

Here, the processes of Steps A9 and A10 described above will be described supplementarily using an example in which pieces of double-encrypted de-identified data acquired in the processes of FIGS. 4(a) and 4(b) are compared with each other.

For a combination of conditions of "presence of use and presence of store visit" illustrated in FIG. 7(a), as data of which user ID (hash value) parts after double encryption match each other, only data of a hash value 4a3 is acquired (can be compared), and thus a count value "1" of the number of pieces of data of which user ID parts after double encryption match each other is acquired as an aggregating result. For a combination of conditions of "presence of use and absence of store visit" illustrated in FIG. 7(b), as data of which user ID (hash value) parts after double encryption match each other, only data of a hash value 6f8 is acquired (can be compared), and thus a count value "1" of the number of pieces of data of which user ID parts after double encryption match each other is acquired as an aggregating result.

Similarly, for a combination of conditions of "absence of use and presence of store visit" illustrated in FIG. 7(c), as data of which user ID (hash value) parts after double encryption match each other, a total of two pieces of data including data of a hash value 1e5 and data of a hash value 5d9 are acquired (can be compared), and thus a count value "2" of the number of pieces of data of which user ID parts after double encryption match each other is acquired as an aggregating result. For a combination of conditions of "absence of use and absence of store visit" illustrated in FIG. 7(d), as data of which user ID (hash value) parts after double encryption match each other, only data of a hash value 3c0 is acquired (can be compared), and thus a count value "1" of the number of pieces of data of which user ID parts after double encryption match each other is acquired as an aggregating result.

Next, in the company A's device 10A, the disclosure limitation processing unit 14 performs a disclosure limitation process based on differential privacy targeting the aggregating result acquired in Step A10 and generates and outputs statistical information in which a correspondence relation with an individual is excluded (Step A11 illustrated in FIG. 2). When the aggregating results acquired in FIGS. 7(a) to 7(d) described above are used as examples in description, the disclosure limitation processing unit 14 performs a disclosure limitation process based on differential privacy targeting an aggregating result of each of four conditions according to a combination of "presence/absence of use" and "presence/absence of store visit" and generates and outputs statistical information (in the example illustrated in FIG. 8, n1, n2, n3, and n4) of each of the four conditions described above in which a correspondence relation with an individual is excluded.

According to the embodiment of the present disclosure described above, by associating the company A's device 10A and the company B's device 10B with each other, statistical information in which a correspondence relation with an individual is excluded can be generated without disclosing personal information included in user data, which is not encrypted, maintained by each device and an encryption key of each device to other devices. In the example described above, statistical information of each of four conditions according to a combination of "presence/absence of use" of a service of company A and "presence/absence of store visit" to a store of company B can be generated, and data association between company A and company B is realized while privacy is protected, whereby useful statistical information can be acquired. Such useful statistical information can be effectively utilized for an advertisement plan, a guest collection plan, and the like for both of company A and company B.

In addition, in a case in which conditions to be satisfied by personal information for extracting target users include a plurality of conditions, the de-identification processing unit 11 generates de-identified data (grouped de-identified data) corresponding to a group of user data of which personal information satisfies each of the plurality of conditions. For this reason, statistical information relating to the number of a plurality of target users satisfying each of a plurality of conditions can be acquired.

Figure 6:
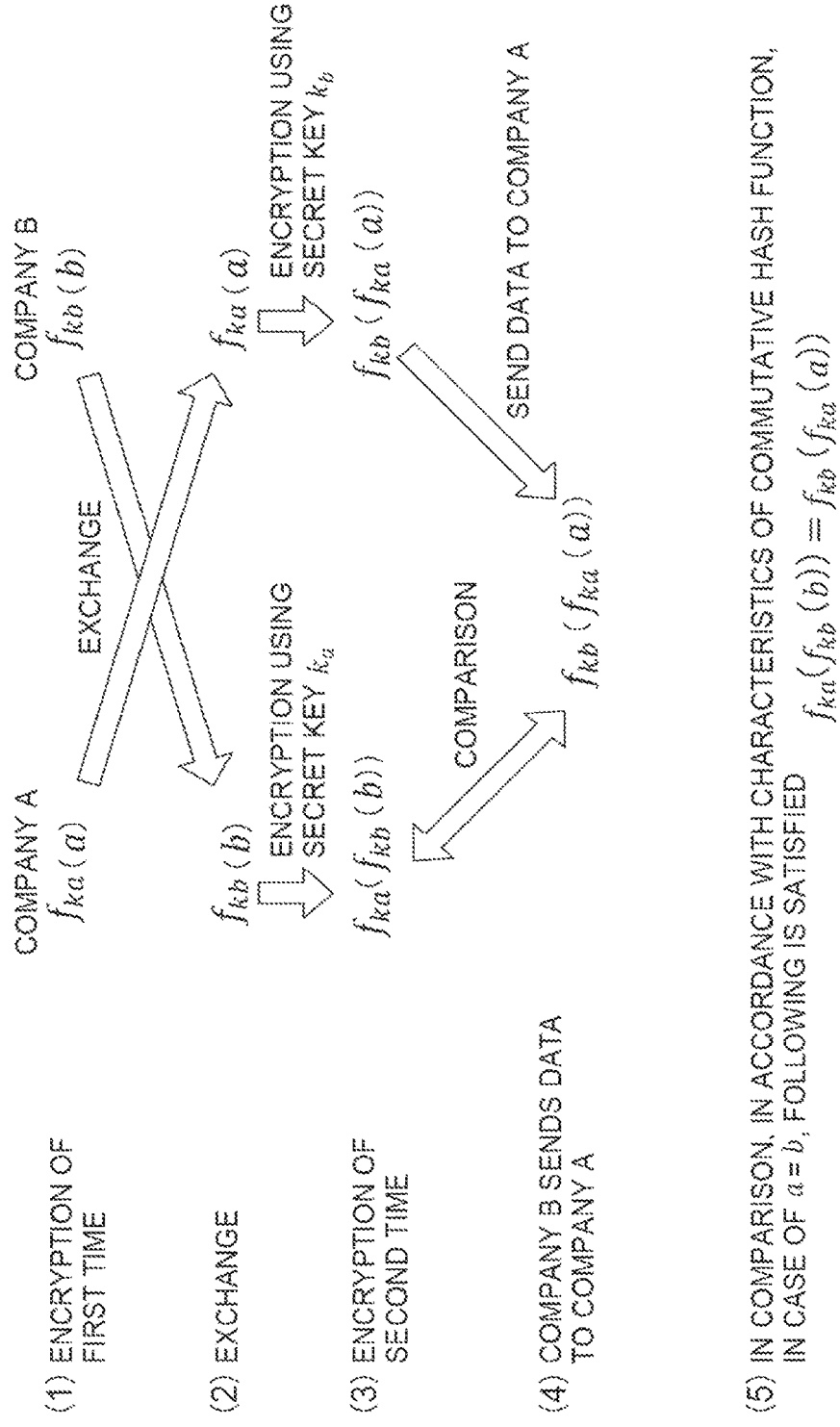
FIG. 6 is a diagram for supplementarily describing the encryption process illustrated in FIG. 5.

In addition, the encryption unit 12 performs a series of processes illustrated in FIGS. 5 and 6 described above (encryption of the first time→exchange of data→encryption of the second time) in association with the encryption unit 12 of the partner device, and thus both the company A's device 10A and the company B's device 10B can perform encryption two times without disclosing the secret keys ka and kb maintained by their own devices to partner devices, and, in accordance with this, can generate double-encrypted de-identified data after double encryption using the secret keys ka and kb described above.

Furthermore, an irreversible conversion process performed by the de-identification processing unit 11 includes a hashing process. For this reason, an application of a special irreversible conversion process becomes unnecessary, and a general irreversible conversion process such as a hashing process can be applied, and a degree of easiness in execution can be improved.

In addition, after performing this hashing process for a user ID, the de-identification processing unit 11 discards salt used in this hashing process. By discarding salt used in the hashing process in this way, all possible measures can be taken against losing of the possibility of restoration of data.

In addition, privacy protection performed by the de-identification processing unit 11 includes at least one of k-anonymity, l-diversity, and t-similarity. For this reason, an application of special privacy protection becomes unnecessary, and general privacy protection such as k-anonymity, l-diversity, and t-similarity can be applied, and a degree of easiness in execution can be improved.

In addition, the disclosure limitation process performed by the disclosure limitation processing unit 14 includes a disclosure limitation process based on differential privacy. For this reason, an application of a special disclosure limitation process becomes unnecessary, a general disclosure limitation process such as a disclosure limitation process based on differential privacy can be applied, whereby a degree of easiness in execution can be improved.

Modified Example

The privacy protection data association system according to the present disclosure described above can employ a first modified example and a second modified example as below. The first modified example is a form in which statistical information relating to the number of target users is generated in cooperation among a total of three devices acquired by further adding "third device" to "one device" and "partner device" among a plurality of devices configuring the privacy protection data association system. The second modified example is a form in which the privacy protection data association system is configured using two types of devices including a plurality of encryption devices performing up to an encryption process and an aggregating device performing an aggregation process and subsequent processes. Hereinafter, the respective modified examples will be sequentially described.

First Modified Example

Figure 9:
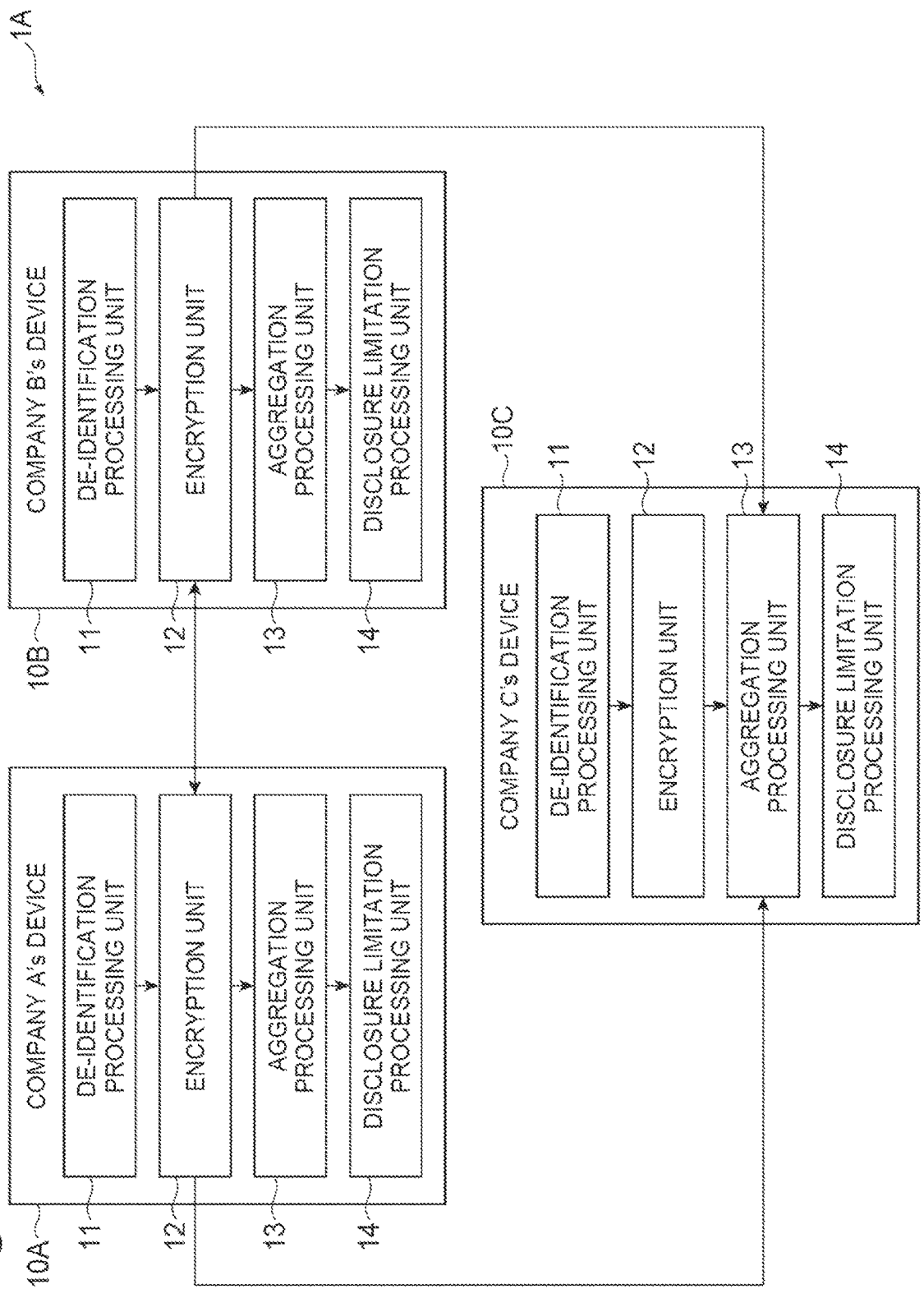
FIG. 9 is a configuration diagram of a privacy protection data association system according to a first modified example.

As illustrated in FIG. 9, a privacy protection data association system 1A according to the first modified example is a system that generates statistical information relating to the number of target users in cooperation among a total of three devices acquired by further adding "third device" to "one device" and "partner device". FIG. 9 illustrates an example in which the privacy protection data association system 1A is configured to include a plurality devices 10A, 10B, and 10C. For the convenience of description, although three devices 10A to 10C are illustrated in FIG. 9, four or more devices may be included.

In the first modified example, although an example in which a company A's device 10A operates as "one device", a company B's device 10B operates as "partner device", and a company C's device 10C operates as "third device" is illustrated, each device may have the same functional block configuration and operate as "one device", "partner device", or "third device".

Functions and operations/effects of "a de-identification processing unit 11, an encryption unit 12, an aggregation processing unit 13, and a disclosure limitation processing unit 14" included in each device are similar to the functions and the operations/effects described in the embodiment of the present disclosure described above, and thus duplicate description will be omitted here. In addition, structure information of user data maintained by each device is shared among devices in advance, and "user ID correspondence part" of double encrypted de-identified data generated in each of the devices 10A and 10B described below can be identified on the basis of the structure information, and comparison between "user ID correspondence parts" of the double-encrypted de-identified data can be configured to be performed.

Figure 10:
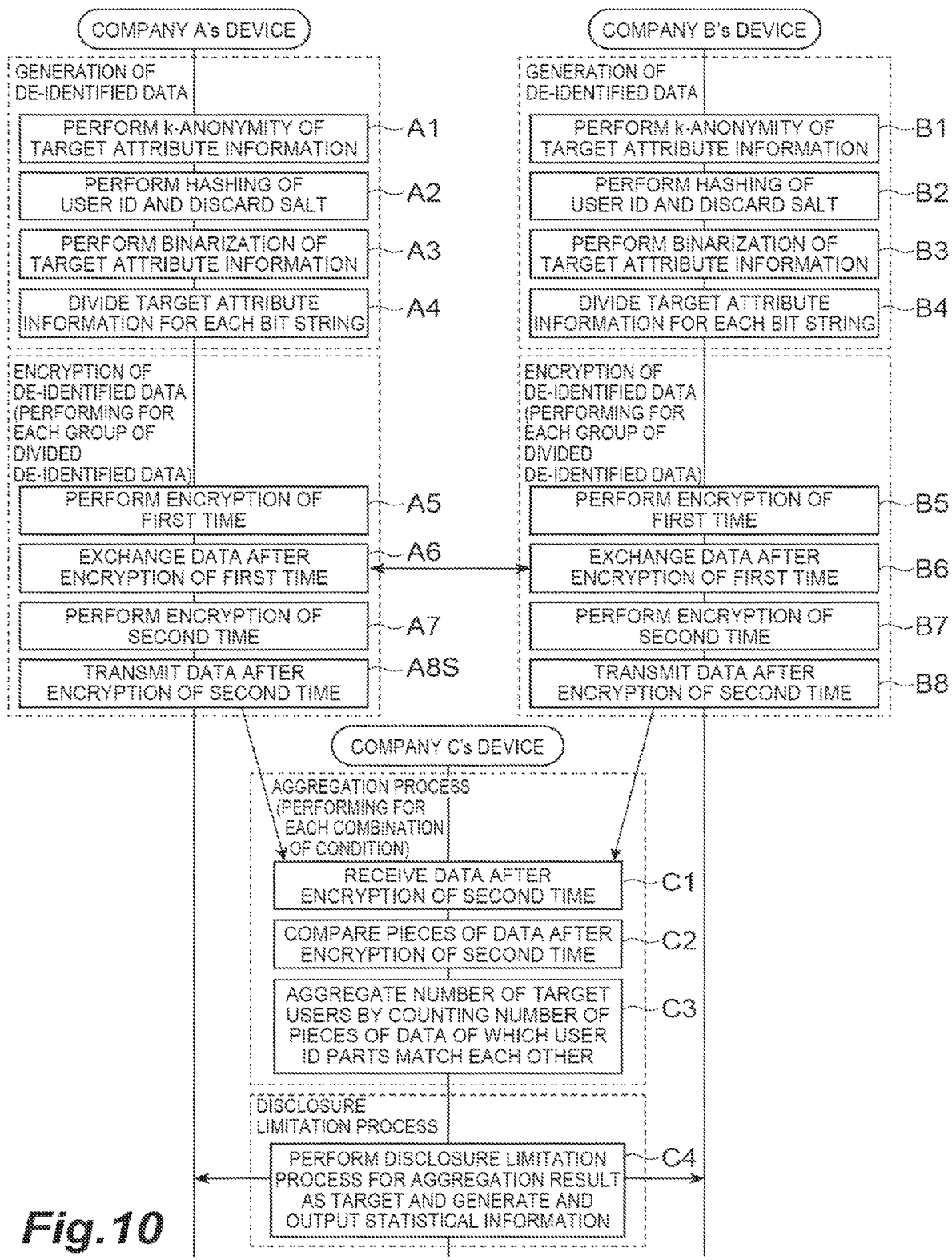
FIG. 10 is a flowchart illustrating a process performed by the privacy protection data association system according to the first modified example.

FIG. 10 illustrates a series of processes performed by the privacy protection data association system 1A according to the first modified example. The same reference signs are assigned to processes similar to those illustrated in FIG. 2 described in the embodiment of the present disclosure described above. In FIG. 10, processes (Steps A1 to A4) relating to generation of de-identified data performed by the de-identification processing unit 11 of the company A's device 10A, processes (Steps A5 to A8S) relating to encryption of de-identified data that is performed by the encryption unit 12 of the company A's device 10A, processes (Steps B1 to B4) relating to generation of de-identified data that is performed by the de-identification processing unit 11 of the company B's device 10B, and processes (Steps B5 to B8) relating to encryption of de-identified data that is performed by the encryption unit 12 of the company B's device 10B are approximately the same as those illustrated in FIG. 2 described above, and thus duplicate description will be omitted. However, in Steps A8S and B8, the double-encrypted de-identified data after the encryption of the second time is transmitted to the company C's device 10C that operates as "third device".

The double-encrypted de-identified data from each of the company A's device 10A and the company B's device 10B is received by the aggregation processing unit 13 of the company C's device 10C (Step C1), thereafter, the aggregation processing unit 13 of the company C's device 10C, similar to Step A9 illustrated in FIG. 2, compares the double-encrypted de-identified data from the device 10A with the double-encrypted de-identified data from the device 10B by referring to the structure information of the user data shared between the devices in advance (Step C2) and, similar to Step A10 illustrated in FIG. 2 described above, collects the number of target users by counting the number of pieces of data of which user ID parts match each other (Step C3). In addition, the disclosure limitation processing unit 14 of the company C's device 10C, similar to Step A11 illustrated in FIG. 2 described above, performs a disclosure limitation process based on differential privacy targeting an aggregating result acquired in Step C3, generates statistical information in which a correspondence relation with an individual is excluded and outputs the generated statistical information to the company A's device 10A and the company B's device 10B (Step C4).

Also in the first modified example described above, while privacy is protected, by realizing mutual data association among the company A's device 10A, the company B's device 10B, and the company C's device 10C, statistical information in which a correspondence relation with an individual is excluded can be generated without disclosing personal information and encryption keys, which are not encrypted, included in the user data maintained by company A and company B to other devices. In this way, while privacy is protected, data association among company A, company B, and company C is realized, and useful statistical information can be acquired. Such useful statistical information can be effectively utilized for an advertisement plan, a guest collection plan, and the like for both of company A and company B maintaining user data.

Second Modified Example

Figure 11:
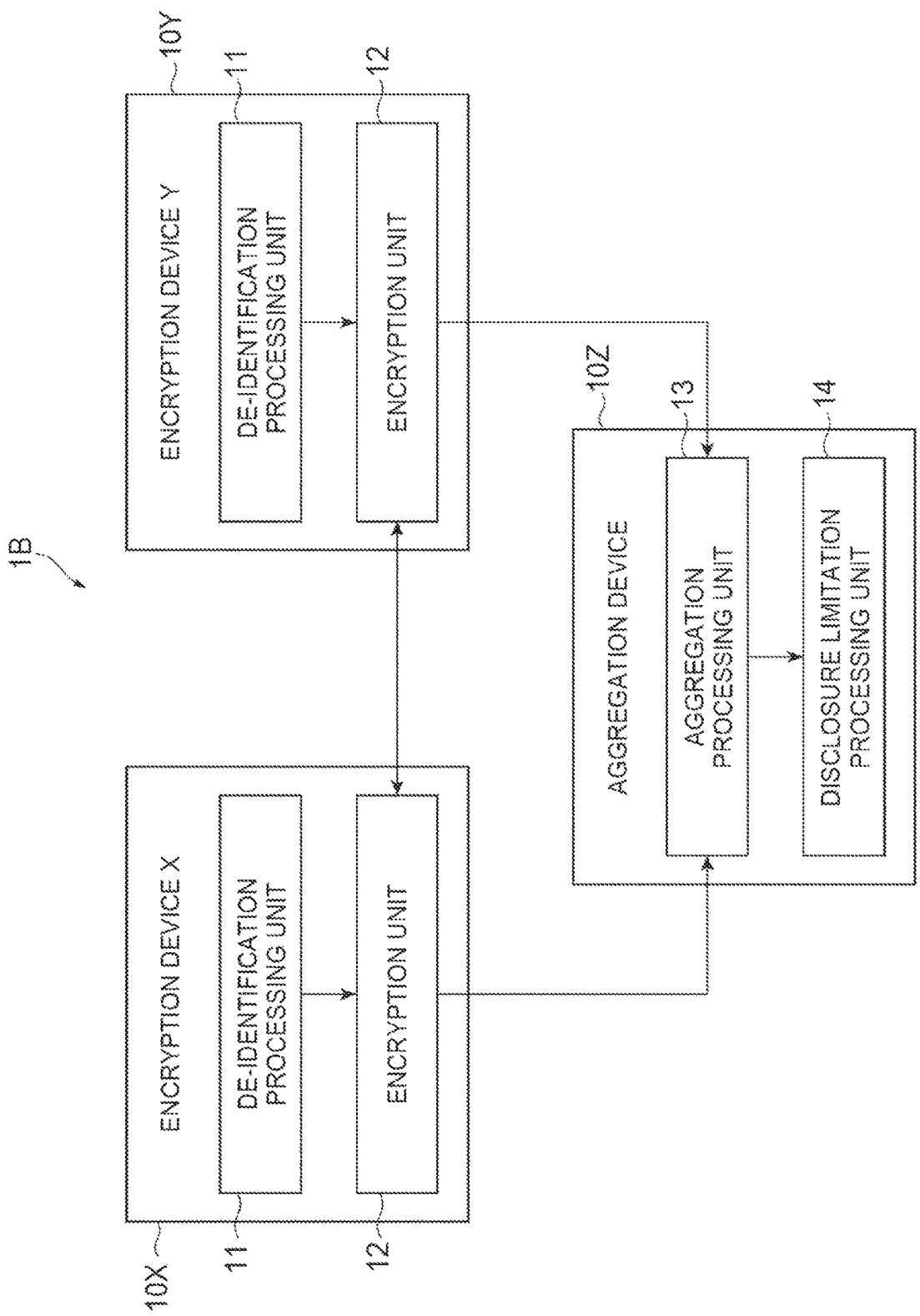
FIG. 11 is a configuration diagram of a privacy protection data association system according to a second modified example.

As illustrated in FIG. 11, a privacy protection data association system 1B according to a second modified example is a system that is configured using two types of devices including encryption devices 10X and 10Y performing up to an encryption process and an aggregation device 10Z performing an aggregation process and subsequent processes and generates statistical information relating to the number of target users in cooperation among a total of three devices including such encryption devices 10X and 10Y and the aggregation device 10Z. In FIG. 11, for the convenience of description, although two encryption devices 10X and 10Y and one aggregation device 10Z are illustrated, three or more encryption devices and two or more aggregation devices may be included.

The second modified example is common to the first modified example described above in that statistical information relating to the number of target users is generated in cooperation among a total of three devices and is different from the first modified example in that there are a total of two types of devices including encryption devices dedicatedly performing up to an encryption process and an aggregation device dedicatedly performing an aggregation process and subsequent processes.

For this reason, as illustrated in FIG. 11, each of the encryption devices 10X and 10Y includes the "de-identification processing unit 11" and the "encryption unit 12" among constituent elements of each device illustrated in FIGS. 1 and 9 described above, and the aggregation device 10Z includes the "aggregation processing unit 13" and the "disclosure limitation processing unit 14" among the constituent elements of each device illustrated in FIGS. 1 and 9 described above. Functions and operations/effects of each of such constituent elements are similar to the functions and the operations/effects described in the embodiment of the present disclosure described above, and thus duplicate description will be omitted here.

Figure 12:
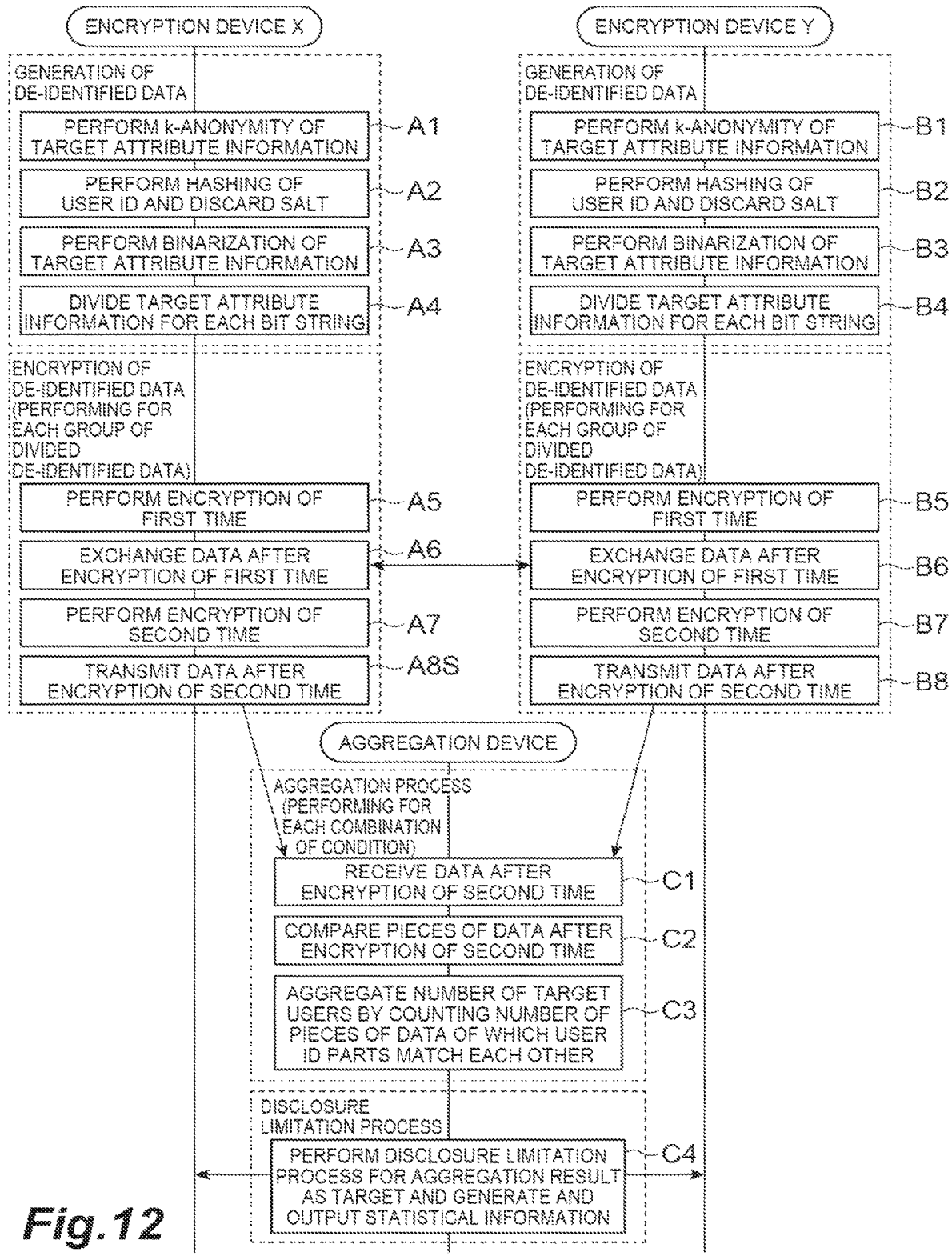
FIG. 12 is a flowchart illustrating a process performed by the privacy protection data association system according to the second modified example.

In FIG. 12, While a series of processes performed by the privacy protection data association system 1B according to the second modified example are illustrated, the same reference signs are assigned to processes similar to those illustrated in FIG. 10 described above in the first modified example. As is apparent when FIG. 12 is compared with FIG. 10, processes of a series of Steps A1 to A8S, B1 to B8, and C1 to C4 are similar to the processes illustrated in FIG. 10.

For this reason, the de-identification processing unit 11 and the encryption unit 12 of the encryption device 10X illustrated in FIG. 11 respectively perform operations similar to those of the de-identification processing unit 11 and the encryption unit 12 of the company A's device 10A illustrated in FIG. 9, and the de-identification processing unit 11 and the encryption unit 12 of the encryption device 10Y illustrated in FIG. 11 respectively perform operations similar to those of the de-identification processing unit 11 and the encryption unit 12 of the device 10A of company B illustrated in FIG. 9. At this time, in each of the encryption devices 10X and 10Y, while privacy is protected, double-encrypted de-identified data generated using a total of two times of encryption is received by the aggregation processing unit 13 of the aggregation device 10Z (Step C1 in FIG. 12), and the aggregation processing unit 13 and the disclosure limitation processing unit 14 of the aggregation device 10Z respectively perform operations similar to those of the aggregation processing unit 13 and the disclosure limitation processing unit 14 of the company C's device 10C illustrated in FIG. 9. In accordance with this, targeting an aggregating result acquired in Step C3 illustrated in FIG. 12, a disclosure limitation process based on differential privacy is performed, and statistical information in which a correspondence relation with an individual is excluded is generated and is output to the encryption devices 10X and 10Y.

Also in the second modified example as above, while privacy is protected, by realizing mutual data association among the encryption devices 10X and 10Y and the aggregation device 10Z, statistical information in which a correspondence relation with an individual is excluded can be generated without disclosing personal information and encryption keys, which are not encrypted, included in the user data maintained by the encryption devices 10X and 10Y to other devices. In this way, while privacy is protected, data association among the encryption devices 10X and 10Y and the aggregation device 10Z is realized, and useful statistical information can be acquired. Such useful statistical information can be effectively utilized for an advertisement plan, a guest collection plan, and the like for both an organization maintaining the encryption device 10X and an organization maintaining the encryption device 10Y.

(Description of Terms, Description of Hardware Configuration (FIG. 13), and the Like)

Each block diagram used for description of the embodiment and the modified examples described above illustrates blocks in units of functions. Such functional blocks (component units) are realized by an arbitrary combination of at least one of hardware and software. In addition, a method for realizing each functional block is not particularly limited. In other words, each functional block may be realized by using one device that is combined physically or logically or using a plurality of devices by directly or indirectly (for example, using a wire, wirelessly, or the like) connecting two or more devices separated physically or logically. A functional block may be realized by one device or a plurality of devices described above and software in combination.

As functions, there are deciding, determining, judging, computing, calculating, processing, deriving, inspecting, searching, checking, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like, and the functions are not limited thereto. For example, a functional block (constituent unit) enabling transmission to function is referred to as a transmitting unit or a transmitter. As described above, a method for realizing all the functions is not particularly limited.

Figure 13:
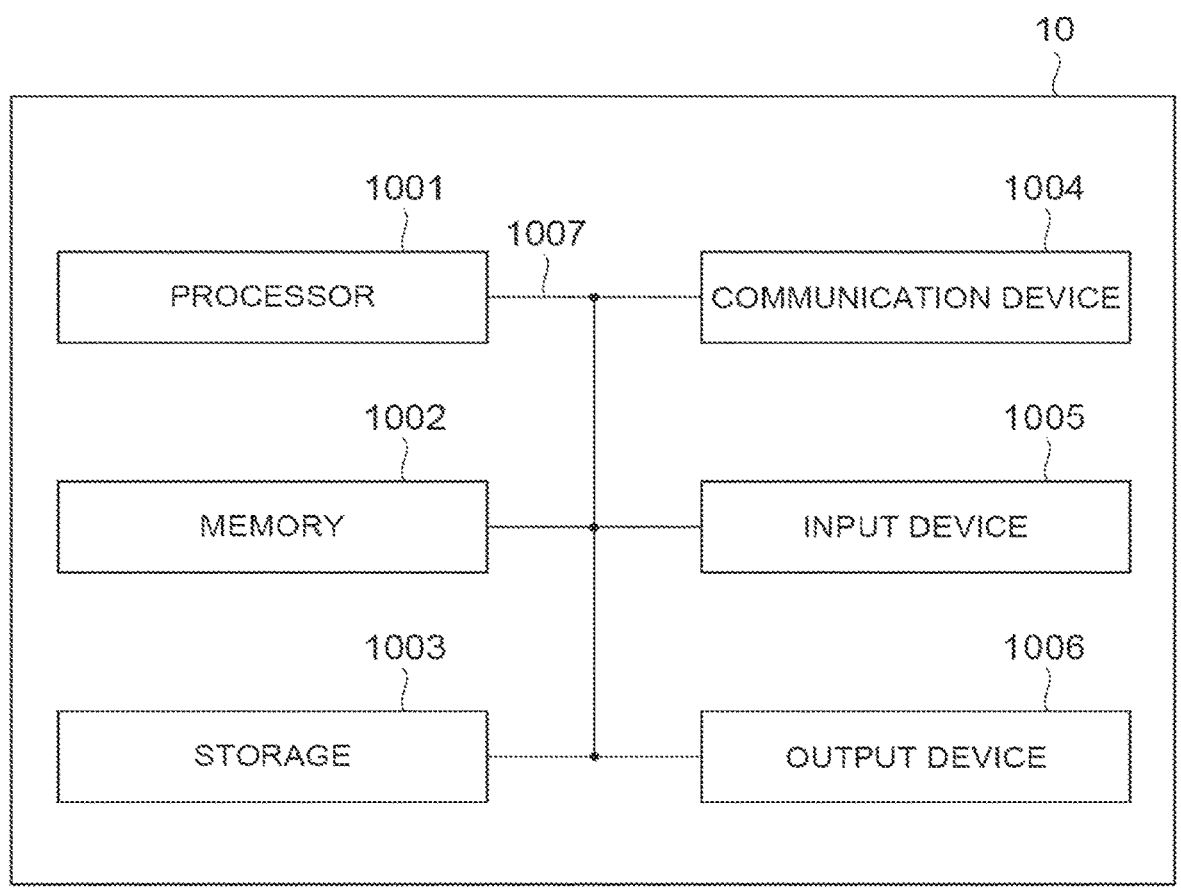
FIG. 13 is a diagram illustrating a hardware configuration example of each device.

For example, the device according to an embodiment of the present disclosure may function as a computer that performs processes according to this embodiment. FIG. 13 is a diagram illustrating an example of a hardware configuration of the device 10 according to an embodiment of the present disclosure. The device 10 collectively refers to the devices 10A to 10C, the encryption devices 10X and 10Y, and the aggregation device 10Z. The device 10 described above, physically, may be configured as a computer device including a processor 1001, a memory 1002, a storage 1003, a communication device 1004, an input device 1005, an output device 1006, a bus 1007, and the like.

In addition, in the following description, a term "device" may be rephrased as a circuit, a device, a unit, or the like. The hardware configuration of the device 10 may be configured to include one or a plurality of devices illustrated in the drawing and may be configured without including some of these devices.

Each function of the device 10 may be realized when the processor 1001 performs an arithmetic operation by causing predetermined software (a program) to be read onto hardware such as the processor 1001, the memory 1002, and the like, controls communication using the communication device 1004, and controls at least one of data reading and data writing for the memory 1002 and the storage 1003.

The processor 1001, for example, controls the entire computer by operating an operating system. The processor 1001 may be configured by a central processing unit (CPU) including an interface with peripheral devices, a control device, an arithmetic operation device, a register, and the like.

In addition, the processor 1001 reads a program (program code), a software module, data, and the like from at least one of the storage 1003 and the communication device 1004 into the memory 1002 and executes various processes in accordance with these. As the program, a program causing a computer to execute at least some of the operations described in the embodiment described above is used. Although the various processes described above have been described as being executed by one processor 1001, the processes may be executed simultaneously or sequentially by two or more processors 1001. The processor 1001 may be realized using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), or the like. The memory 1002 can store a program (a program code), a software module, and the like executable for performing the radio communication method according to one embodiment of the present disclosure.

The storage 1003 is a computer-readable recording medium and, for example, may be configured by at least one of an optical disc such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above, for example, may be a database including at least one of the memory 1002 and a storage 1003, or any other appropriate medium.

The communication device 1004 is hardware (a transmission/reception device) for performing inter-computer communication through at least one of a wired network and a wireless network and, for example, may be called also a network device, a network controller, a network card, a communication module, or the like.

The input device 1005 is an input device (for example, a keyboard, a mouse, a microphone, a switch, buttons, a sensor, or the like) that accepts an input from the outside. The output device 1006 is an output device (for example, a display, a speaker, an LED lamp, or the like) that performs output to the outside. In addition, the input device 1005 and the output device 1006 may have an integrated configuration (for example, a touch panel). In addition, devices such as the processor 1001, the memory 1002, and the like are connected using a bus 1007 for communication of information. The bus 1007 may be configured using a single bus or configured using buses different between devices.

The aspects/embodiments described in the present disclosure may be individually used, used in combination, or be used with being switched therebetween in accordance with execution. In addition, a notification of predetermined information (for example, a notification of being X) is not limited to being performed explicitly and may be performed implicitly (for example, a notification of the predetermined information is not performed).

As above, while the present disclosure has been described in detail, it is apparent to a person skilled in the art that the present disclosure is not limited to the embodiments described in the present disclosure. The present disclosure may be modified or changed without departing from the concept and the scope of the present disclosure set in accordance with the claims. Thus, the description presented in the present disclosure is for the purpose of exemplary description and does not have any limited meaning for the present disclosure.

The processing sequence, the sequence, the flowchart, and the like of each aspect/embodiment described in the present disclosure may be changed in order as long as there is no contradiction. For example, in a method described in the present disclosure, elements of various steps are presented using an exemplary order, and the method is not limited to the presented specific order.

The input/output information and the like may be stored in a specific place (for example, a memory) or managed using a management table. The input/output information and the like may be overwritten, updated, or added to. The output information and the like may be deleted. The input information and the like may be transmitted to another device.

Description of "on the basis of" used in the present disclosure does not mean "only on the basis of" unless otherwise mentioned. In other words, description of "on the basis of" means both "only on the basis of" and "on the basis of at least."

In a case in which "include," "including," and modifications thereof are used in the present disclosure, such terms are intended to be inclusive like a term "comprising." In addition, a term "or" used in the present disclosure is intended to be not an exclusive logical sum.

In the present disclosure, for example, in a case in which an article such as "a," "an," or "the" in English is added through a translation, the present disclosure may include a plural form of a noun following such an article.

In the present disclosure, a term "A and B are different" may means that "A and B are different from each other". In addition, the term may mean that "A and B are different from C". Terms "separated", "combined", and the like may be interpreted similar to "different".

REFERENCE SIGNS LIST 1, 1A, 1B . . . Privacy protection data association system; 10, 10A, 10B, 10C . . . Device; 10X, 10Y . . . Encryption device; 10Z . . . Aggregation device; 11 . . . De-identification processing unit; 12 . . . Encryption unit; 13 . . . Aggregation processing unit; 14 . . . Disclosure limitation processing unit; 1001 . . . Processor; 1002 . . . Memory; 1003 . . . Storage; 1004 . . . Communication device; 1005 . . . Input device; 1006 . . . Output device; 1007 . . . Bus.

The invention claimed is:

1. A privacy protection data association system including a plurality of devices maintaining user data including a user ID and personal information relating to a user,
   wherein each of the devices includes:
   processing circuitry configured to
      de-identify the user data to generate de-identified data;
      perform first encryption targeting the de-identified data by using a self-encryption key maintained by its own device;
      receive, from a partner device, de-identified data generated by a first encryption process separately performed by the partner device;
      perform, by using the self-encryption key maintained by its own device, second encryption targeting the de-identified data received from the partner device;
      receive, from the partner device, double-encrypted de-identified data generated by a second encryption process separately performed by the partner device; and
      compare double-encrypted de-identified data generated by the own second encryption with the double-encrypted de-identified data received from the partner device to aggregate, as a number of target users, a number of pieces of the double-encrypted de-identified data of which user ID correspondence parts identified on a basis of pre-determined structure information of the user data match each other,
   wherein the processing circuitry
      performs de-identification processing including an irreversible conversion process on the user ID, and
      performs the own first encryption and the own second encryption by means of a unidirectional commutative operation with a key.

2. The privacy protection data association system according to claim 1, wherein the processing circuitry extracts the user data based on a condition that the personal information needs to satisfy, and generates de-identified data corresponding to the extracted user data.

3. The privacy protection data association system according to claim 2, wherein, in a case in which the condition that the personal information needs to satisfy includes a plurality of conditions, the processing circuitry generates grouped de-identified data corresponding to a group of user data of which the personal information satisfies each of the plurality of conditions.

4. The privacy protection data association system according to claim 1, wherein the irreversible conversion process includes a hashing process.

5. The privacy protection data association system according to claim 4, wherein, after the hashing process on the user ID is performed, the processing circuitry discards salt used in the hashing process.

6. The privacy protection data association system according to claim 1, wherein the processing circuitry additionally performs a processing for privacy protection on the personal information.

7. The privacy protection data association system according to claim 1, wherein the processing circuitry of each of the devices is further configured to:
generate disclosure limited statistical information by performing a disclosure limitation process targeting an acquired aggregating result.

8. A privacy protection data association system including a plurality of devices maintaining user data including a user ID and personal information relating to a user,
wherein each of the devices includes:
processing circuitry configured to
de-identify the user data to generate de-identified data;
perform first encryption targeting the de-identified data by using a first encryption key maintained by its own device which is a first device;
receive, from a second device, de-identified data generated by a first encryption process separately performed by the second device;
perform, by using the first encryption key, second encryption targeting de-identified data received from the second device;
receive, from the second device, double-encrypted de-identified data generated by a second encryption process separately performed by the second device; and
compare, as a third device, double-encrypted de-identified data generated by the own second encryption with the double-encrypted de-identified data received from the second device to aggregate, as a number of target users, a number of pieces of the double-encrypted de-identified data of which user ID correspondence parts identified on a basis of predetermined structure information of the user data match each other,
wherein the processing circuitry
performs de-identification processing including an irreversible conversion process on the user ID, and
performs the own first encryption and the own second encryption by means of a unidirectional commutative operation with a key.

9. The privacy protection data association system according to claim 8, wherein the processing circuitry extracts the user data based on a condition that the personal information needs to satisfy, and generates de-identified data corresponding to the extracted user data.

10. The privacy protection data association system according to claim 8, wherein the irreversible conversion process includes a hashing process.

11. The privacy protection data association system according to claim 8, wherein the processing circuitry additionally performs a processing for privacy protection on the personal information.

12. The privacy protection data association system according to claim 8, wherein the processing circuitry each of the devices is further configured to:
generate disclosure limited statistical information by performing a disclosure limitation process targeting an acquired aggregating result.

13. A privacy protection data association system including: an aggregation device; and a plurality of encryption devices maintaining and encrypting user data including a user ID and personal information relating to a user,
wherein each of the encryption devices includes:
processing circuitry configured to
de-identify the user data to generate de-identified data;
perform first encryption targeting the de-identified data by using a self-encryption key maintained by its own device;
receive, from a partner device of the encryption device, de-identified data generated by a first encryption process separately performed by the partner device; and
perform, by using the self-encryption key maintained by its own device, second encryption targeting the de-identified data received from the partner device,
wherein the aggregation device includes;
processing circuitry configured to
receive, from each of the encryption device and the partner device, double-encrypted de-identified data generated by a second encryption process separately performed by each of the encryption device and the partner device; and
compare the double-encrypted de-identified data received from the encryption device with the double-encrypted de-identified data received from the partner device of the encryption device to aggregate, as a number of target users, a number of pieces of the double-encrypted de-identified data of which user ID correspondence parts identified on a basis of predetermined structure information of the user data match each other,
wherein the processing circuitry of the encryption device performs de-identification processing including an irreversible conversion process on the user ID, and
performs the own first encryption and the own second encryption by means of a unidirectional commutative operation with a key.

14. The privacy protection data association system according to claim 13, wherein the processing circuitry of the aggregation device is further configured to:
generate disclosure limited statistical information by performing a disclosure limitation process targeting an acquired aggregating result.

15. The privacy protection data association system according to claim 13, wherein the processing circuitry of the encryption device extracts the user data based on a condition that the personal information needs to satisfy, and generates de-identified data corresponding to the extracted user data.

16. The privacy protection data association system according to claim 13, wherein the irreversible conversion process includes a hashing process.

17. The privacy protection data association system according to claim 13, wherein the processing circuitry of the encryption device additionally performs a processing for privacy protection on the personal information.

* * * * *